United States Patent [19]

Heimann et al.

[11] Patent Number: 5,405,089

[45] Date of Patent: Apr. 11, 1995

[54] SHOWER HEAD WITH ELASTOMERIC NOZZLES

[75] Inventors: Bruno Heimann, Fröndenberg; Veit Bechte, Holzwickede; Harald Körfgen, Fröndenberg; Hans-Jürgen Jensen, Welver, all of Germany

[73] Assignee: Friedrich Grohe Aktiengesellschaft, Hemer, Germany

[21] Appl. No.: 146,909

[22] Filed: Nov. 1, 1993

[30] Foreign Application Priority Data

Nov. 4, 1992 [DE] Germany .................... 42 37 203.8
Mar. 18, 1993 [DE] Germany .................... 43 08 599.7

[51] Int. Cl.⁶ .................... B05B 1/18; B05B 15/02
[52] U.S. Cl. .................... 239/533.14; 239/533.13; 239/559; 239/562; 239/602; 239/DIG. 12; 239/DIG. 19
[58] Field of Search ............. 239/107, 533.1, 533.13, 239/533.14, 546, 558, 559, 562, 567, 602, DIG. 12, DIG. 19; 264/267, 255

[56] References Cited

U.S. PATENT DOCUMENTS

| | | | |
|---|---|---|---|
| 2,402,741 | 6/1946 | Draviner | 239/DIG. 12 X |
| 2,559,894 | 7/1951 | Nordell | 239/602 X |
| 4,241,878 | 12/1980 | Underwood | 239/602 X |
| 4,351,791 | 9/1982 | de Putter | 264/267 |
| 5,172,862 | 12/1992 | Heimann et al. | 239/602 X |
| 5,228,625 | 7/1993 | Grassberger | 239/602 X |

FOREIGN PATENT DOCUMENTS

| | | |
|---|---|---|
| 0443538 | 8/1991 | European Pat. Off. . |
| 2446134 | 9/1980 | France .................... 239/602 |
| 2623191 | 5/1976 | Germany . |
| 3733287 | 4/1989 | Germany . |
| 3943062 | 7/1991 | Germany . |

*Primary Examiner*—William Grant
*Attorney, Agent, or Firm*—Herbert Dubno; Andrew Wilford

[57] ABSTRACT

A shower head has a rigid body forming a pressurizable compartment having a downstream wall of composite synthetic-resin material having an inner face and formed with an array of throughgoing holes so that pressurized water in the compartment will exit therefrom through the holes. A unitary liner sheet of a soft elastomer has an outer face bonded to the inner face of the downstream wall and is formed with respective tubular nipples fitting in and projecting through the holes. Each nipple forms a throughgoing passage having an inner end opening in the compartment and an outer end opening outside the body. The liner sheet and integral nipples are molded in situ against the inner face of the plate forming the downstream wall of the shower body. The composite synthetic-resin material is a polybutyleneterephthalate and the elastomer is silicone or the composite synthetic-resin material can be polypropylene and the elastomer a thermoplastic.

10 Claims, 3 Drawing Sheets

SHOWER HEAD WITH ELASTOMERIC NOZZLES

SPECIFICATION

1. Field of the Invention

The present invention relates to a spray or shower head. More particularly this invention concerns a spray or shower head set up to allow lime and other deposits to be cleaned easily from it.

2. Background of the Invention

In order to facilitate clearing of lime deposits and the like from the nozzles of a shower head it is known from commonly owned U.S. Pat. No. 5,172,862 issued 22 Dec. 1992 to line the outlet holes of the head with elastomeric tubes. The shower head is formed with a compartment that is pressurized with water and that has a downstream face formed with an array of throughgoing holes from which the water is intended to exit. The tubes are typically formed on a liner sheet that lies on the downstream face of the chamber with the tubes projecting through the holes. When crust builds up on the downstream ends of the tubes, they can be deformed to break it loose.

The main problem with this type of system is that the sheet or ring on which the tubes are formed is normally only held by water pressure against the downstream face of the water compartment. Thus water can get between the sheet and the downstream face and find its way out of the compartment between the tubes and their holes. This makes the shower head dribble, and allows lime deposit to build up directly on the hard wall of the shower-head body, around the tubes.

OBJECTS OF THE INVENTION

It is therefore an object of the present invention to provide an improved shower head.

Another object is the provision of such an improved shower head which overcomes the above-given disadvantages, that is which can easily be cleared of lime and similar deposits and where lime cannot build up between the outer surfaces of the tubes and the shower-body holes.

A further object is to provide an improved and simplified method of making the shower head.

SUMMARY OF THE INVENTION

A shower head has according to the invention a rigid body forming a pressurizable compartment having a downstream wall of composite synthetic-resin material having an inner face and formed with an array of throughgoing holes so that pressurized water in the compartment will exit therefrom through the holes. A unitary liner sheet of a soft elastomer has an outer face bonded to the inner face of the downstream wall and is formed with respective tubular nipples fitting in and projecting through the holes. Each nipple forms a throughgoing passage having an inner end opening in the compartment and an outer end opening outside the body.

In accordance with this invention the liner sheet and integral nipples are molded in situ against the inner face of the plate forming the downstream wall of the shower body. The composite synthetic-resin material is a polybutyleneterephthalate and the elastomer is silicone or the composite synthetic-resin material can be polypropylene and the elastomer a thermoplastic. Either way, molding the liner against the wall will ensure a perfect fit and extremely good bonding. It will be impossible for water to get between the liner and the shower body so that leakage and deposit-formation at this interface is out of the question.

According to a further feature of this invention the composite material contains fiber reinforcement. The wall has an outer face formed around each hole with a recess and the nipples each are formed between their ends with an outwardly projecting annular ridge in the respective recess. Each passage tapers from its inner end to its outer end and each nipple is of a wall thickness that decreases regularly from its ridge toward its outer end. This makes it easy, simply by brushing the hand over the projecting thin-walled ends of the nipples, to break off any crusty deposits on the liner tubes.

To give the shower head of this invention an automatic flow-regulating capacity the sheet has an inner face directed into the compartment and is formed on the inner face around each of the inner passage ends with a flow-restricting annular inward bulge. The elastomer is so soft that it deforms at a pressure above about 1 bar in the compartment to flatten the bulges and restrict the respective passages. Thus as pressure increases in the compartment above this 1 bar threshold, the bulges will flatten and thereby restrict the respective passages, automatically limiting flow through them. The wall is formed with respective chamfers where the inner ends of the passages open on the inner face of the wall and the sheet and nipples complementarily fit the chamfers to further enhance this effect. Furthermore each bulge has an inwardly tapering generally frustoconical outer periphery and at least the bulges have a Shore hardness of about 60.

BRIEF DESCRIPTION OF THE DRAWING

The above and other objects, features, and advantages will become more readily apparent from the following description, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawings.

SPECIFIC DESCRIPTION

Figure 1:
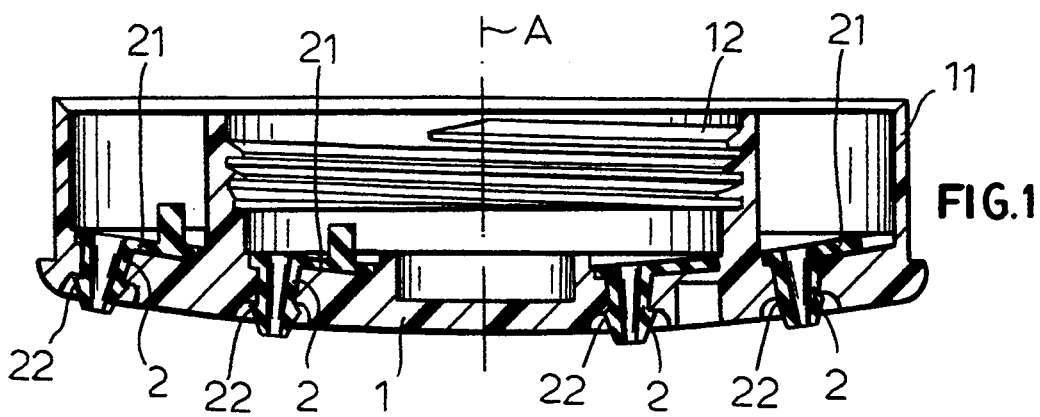
FIG. 1 is a vertical section through the downstream end of a portion of a spray head according to the invention.
Figure 1A:
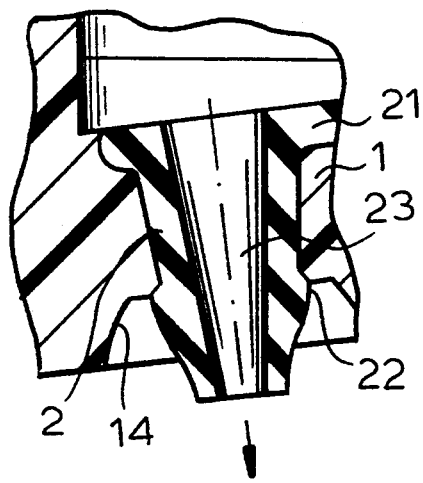
FIG. 1a is a large-scale view of a detail of FIG. 1.
Figure 1B:
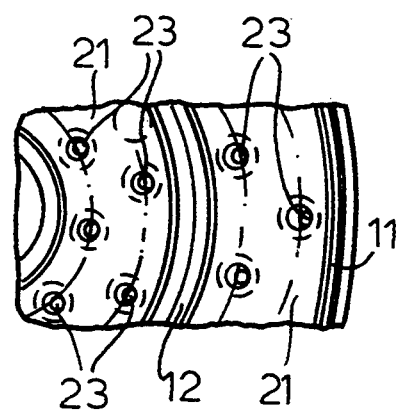
FIG. 1b is a top view of a detail of FIG. 1.
Figure 2:
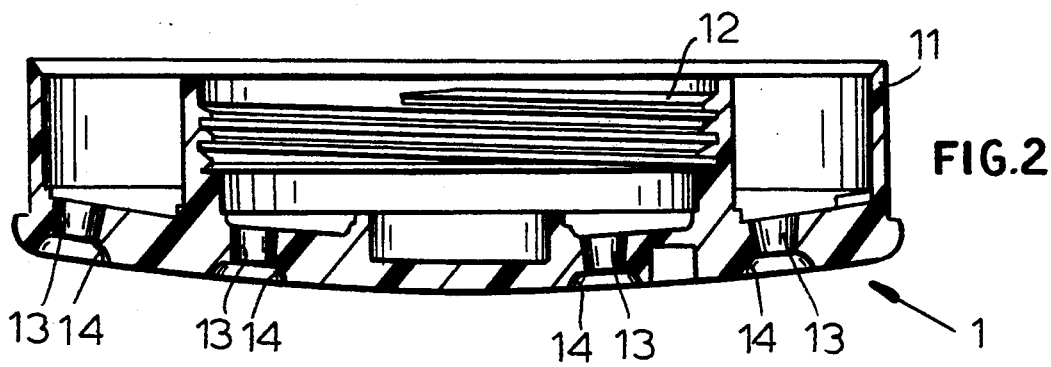
FIG. 2 is a vertical section through the shower body alone of this invention.

As seen in FIGS. 1 through 2 an end plate 1 as used in the hand shower described in commonly owned patent application Ser. No. 07/884,396 filed 15 May 1992, (now U.S. Pat. No. 5,297,735 issued 29 Mar. 1994) is centered on an axis A and formed as an outwardly spherically convex disk of glass-fiber-reinforced polybutyleneterephthalate having a rearwardly projecting annular skirt 11 and a rearwardly open centered screwthread 12. This plate 1 forms the downstream wall of a pressurizable compartment and is formed with two circular arrays of axially throughgoing holes 13 that are generally frustoconical and rearwardly flared. The outer face of the plate 1 (here and normally directed downward) is formed around each such hole 13 with an annular recess 14 of outwardly flared frustoconical shape.

Each of the holes 13 receives a respective tubular nipple 2 formed unitarily of a soft elastomer, here silicone, with one of two annular sheets 21. Each nipple 2 forms a passage 23 of outwardly decreasing cross-section that has a frustoconical inner wall. Furthermore, each nipple 2 is formed with a radially outwardly projecting ridge 22 that bears backward against the floor of the respective recess 14 to prevent this nipple 2 from getting accidently pushed back into the respective hole 13. Outwardly of the ridge 22, each nipple 2 has an outwardly tapering frustoconical outer surface so that it is of outwardly decreasing wall thickness.

Each sheet 21 is unitarily formed with the respective nipples by fitting the plate 1, after molding it, into a mold and injecting the plastified silicone against its back face. Thus the sheets 21 and nipples 2 are bonded to the surfaces of the plate 1 that they touch, ensuring that there will be no water leakage between them and, therefore, no possibility of lime deposits between them.

Alternately this assembly could be made using polypropylene for the disk 1 and a thermoplastic elastomer for the nipples 2 and sheets 21. The same in situ injection-molding process would be used to make it.

Lime deposits will inherently form at the normally lower outer ends of the nipples 2. To remove them the user need merely brush his or her hand over these lower ends, thereby deforming the nipples 2 and making the hard deposits flake off.

Figure 3:
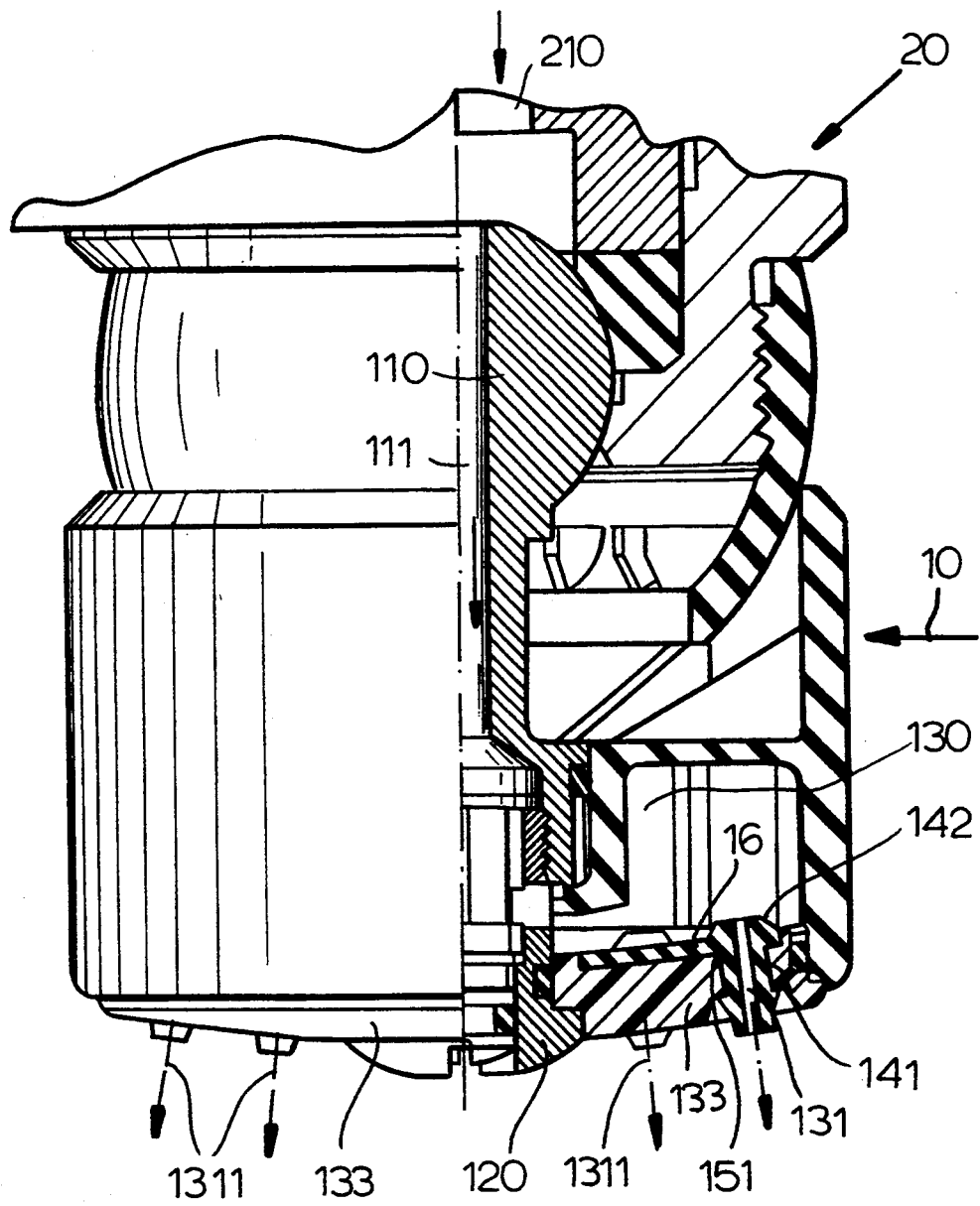
FIG. 3 is an axial section through another shower head according to the invention.
Figure 4:
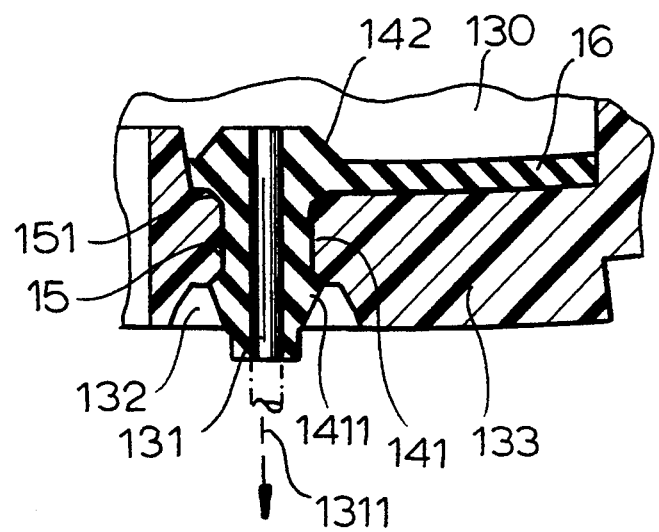
FIGS. 4 and 5 are large-scale sectional views of details of the shower head of FIG. 3 operating under moderate and high pressure, respectively.
Figure 5:
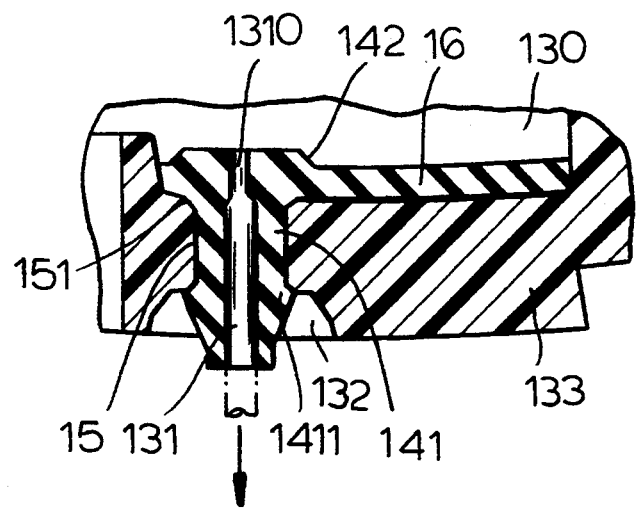

In the arrangement of FIGS. 3 through 5 a shower body 10 is mounted on a holder 20 to which water under pressure is fed via an inlet opening 210 to pass through a passage 111 of a swivel 110 into a chamber 130 behind a front plate 133 held in place by a screw 120. This front plate 133, which forms the downstream wall of the chamber 130, is formed with an array of holes 15. Each hole 15 is fitted with a respective elastomeric nipple 141 defining a respective passage 131 of normally cylindrical shape centered on a respective axis 1311. These nipples 141 in turn are all unitarily formed on an annular lining sheet 16 recessed in a groove formed in the inner face of the end wall 133, and each nipple 141 has a bulge 1411 like the bulges 22 of FIGS. 1 through 2 and fitting in a recess 132 comparable to the recesses 14.

Here the inner end of the hole 15 is chamfered at 45° at 151 and the sheet 16 is formed around the inner end of each passage 131 with an inwardly directed raised portion 142. The sheet 16 and nipples 14 are unitarily formed of a soft elastomer that deforms when pressure is above about 1 bar in the compartment 130 to flatten as indicated in FIG. 5, thereby restricting an inner portion 1310 of each of the passages 131. This reduces flow through the passages 131, thereby automatically restricting flow as pressure increases. This principle is described in some detail in German patent document 2,623,191 of H. Siegmund.

We claim:

1. A shower head comprising:
   a rigid body forming a pressurizable compartment having a downstream wall of composite synthetic-resin material having an inner face and an outer face formed with an array of throughgoing holes extending between the faces, the outer face formed around each hole with a recess, whereby pressurized water in the compartment will exit from the compartment through the holes; and
   a unitary liner sheet of a soft elastomer having an outer face bonded to the inner face of the downstream wall and formed with respective tubular nipples fitting in and projecting through the holes, each nipple forming a throughgoing passage having an inner end opening in the compartment and an outer end opening outside the body, the nipples each being formed between their ends with an outwardly projecting annular ridge in the respective recess.

2. The shower head defined in claim 1 wherein the composite synthetic-resin material is a polybutyleneterephthalate and the elastomer is silicone.

3. The shower head defined in claim 1 wherein the composite synthetic-resin material is polypropylene and the elastomer is thermoplastic.

4. The shower head defined in claim 1 wherein the composite material contains fiber reinforcement.

5. The shower head defined in claim 1 wherein each passage tapers from its inner end to its outer end and each nipple is of a wall thickness that decreases regularly from its ridge toward its outer end.

6. A shower head comprising:
   a rigid body forming a pressurizable compartment having a downstream wall of composite synthetic-resin material having an inner face and formed with an array of throughgoing holes, whereby pressurized water in the compartment will exit therefrom through the holes; and
   a unitary liner sheet of a soft elastomer having an outer face bonded to the inner face of the downstream wall and formed with respective tubular nipples fitting in and projecting through the holes, each nipple forming a throughgoing passage having an inner end opening in the compartment and an outer end opening outside the body, the sheet having an inner face directed into the compartment and being formed on the inner face around each of the inner passage ends with a flow-restricting annular inward bulge.

7. The shower head defined in claim 6 wherein the elastomer is so soft that it deforms at a pressure above about 1 bar in the compartment to flatten the bulges and restrict the respective passages.

8. The shower head defined in claim 6 wherein the wall is formed with respective chamfers where the inner ends of the passages open on the inner face of the wall, the sheet and nipples complementarily fitting the chamfers.

9. The shower head defined in claim 6 wherein each bulge has an inwardly tapering generally frustoconical outer periphery.

10. The shower head defined in claim 6 wherein at least the bulges have a Shore hardness of about 60.

* * * * *